United States Patent
Faita et al.

(10) Patent No.: US 6,423,203 B1
(45) Date of Patent: Jul. 23, 2002

(54) METHOD FOR THE INTEGRATION OF FUEL CELLS INTO ELECTROCHEMICAL PLANTS

(75) Inventors: Giuseppe Faita, Novara; Angelo Ottaviani, Milan, both of (IT)

(73) Assignee: Nuvera Fuel Cells Europe S.r.l. (IT)

( * ) Notice: Subject to any disclaimer, the term of this patent is extended or adjusted under 35 U.S.C. 154(b) by 0 days.

(21) Appl. No.: 09/674,312

(22) PCT Filed: Apr. 23, 1999

(86) PCT No.: PCT/EP99/02772

§ 371 (c)(1),
(2), (4) Date: Oct. 27, 2000

(87) PCT Pub. No.: WO99/56334

PCT Pub. Date: Nov. 4, 1999

(30) Foreign Application Priority Data

Apr. 29, 1998 (IT) .......................................... MI98A0914

(51) Int. Cl.⁷ .................................................. C25B 1/00
(52) U.S. Cl. ........................ 205/343; 205/349; 205/637; 204/253; 204/266; 204/267; 429/32; 429/22; 429/23; 429/25
(58) Field of Search ................................. 205/343, 349, 205/637; 204/253, 266, 267; 429/32, 22, 23, 25

(56) References Cited

U.S. PATENT DOCUMENTS

| | | |
|---|---|---|
| 4,084,038 A | * 4/1978 | Scragg et al. ................. 429/19 |
| 4,310,605 A | 1/1982 | Early et al. .................... 429/18 |
| 4,689,133 A | 8/1987 | McIlhenny .................. 204/269 |
| 4,778,579 A | 10/1988 | Levy et al. .................... 429/17 |

FOREIGN PATENT DOCUMENTS

| | | |
|---|---|---|
| DE | 1421366 | 10/1968 |
| EP | 0701294 | 3/1996 |
| FR | 1326570 | 8/1963 |

* cited by examiner

*Primary Examiner*—Bruce F. Bell
(74) *Attorney, Agent, or Firm*—Bierman, Muserlian and Lucas

(57) ABSTRACT

The invention describes a method for the direct connection of fuel cells to electrolyzers of electrochemical plants producing hydrogen as a by-product. The by-product hydrogen is fed to the fuel cells and the electric energy thereby produced is transferred to the electrolyzers, with the consequent saving of the overall energy consumption. The direct coupling avoids the need for DC/AC converters or voltage adjusters and may be effected either in series or in parallel. In the latter case the fuel cell are assembled in modules, the number and voltage of which is regulated by means of interrupters activated by a computerised control and supervision system. As an alternative, the voltage of the modules may be varied by varying the pressure of the air fed to the fuel cells.

20 Claims, 5 Drawing Sheets

METHOD FOR THE INTEGRATION OF FUEL CELLS INTO ELECTROCHEMICAL PLANTS

This application is a 371 of PCT/EP99/02772 filed Apr. 23, 1999.

DESCRIPTION OF THE INVENTION

The fuel cell is a static device which permits the direct conversion of chemical energy into electrical energy. As such, the fuel cell is not affected by the limitations of the Camot principle relating to thermal engines and is in fact characterised by high conversion efficiencies (50% or more with reference to the low heating value of the fed fuel). The most interesting types of fuel cells are those fed with air and hydrogen or a gas containing hydrogen, under pressure, usually from slightly above the atmospheric pressure to 3–5 bar. In particular, today attention is focused on the ion exchange polymeric membrane type, in view of its simplicity and for the potentially strong cost reduction. A type of design particularly suitable for membrane fuel cells is described in the U.S. Pat. No. 5,482,792. The technical development of the fuel cells today is extremely advanced, however their commercialisation is still far ahead due to the still high production costs, the lack of a reliable and efficient demonstrated design for the system of auxiliary components necessary to ensure the operation of the fuel cells, as well as of cost-effective availability of pure hydrogen or gas containing significant amount of hydrogen. This last problem is in fact overcome inside chemical complexes comprising electrochemical plants, typically chlor-alkali plants, chlorate electrolysis and hydrochloric acid electrolysis or refinery plants, which are characterised sometimes by the production of large amounts of by-product gases containing hydrogen. Electrochemical plants are particularly suitable for the integration with fuel cells, especially as the produced hydrogen is frequently very pure (chlor-alkali electrolysis, hydrochloric acid electrolysis) or can be easily purified (from traces of oxygen and chlorine, chlorate electrolysis). In addition, the electric energy produced by the fuel cells is typically of the direct type, same as the electric energy required by electrochemical plant electrolyzers. Therefore, in principle, it should be easy to integrate fuel cells into electrochemical plants, with the final result of substantially decreasing the overall consumption of electric power through the recovery of hydrogen. Conversely, in the case of chemical plants, the electric energy produced by the fuel cells should be converted into alternate current, which is the form of energy required by electric motors, heaters and other electrical apparatuses installed in these plants. The DC/AC converters of electric energy from direct to alternate current, known as inverters, are very expensive devices which make the assembly of the installation (fuel cells—connection piping—heat exchangers—inverter—electrical connection bus bars) economically disadvantageous with respect to the value of the produced electric energy.

These considerations take into account the interest shown since long towards the integration of fuel cells into electrochemical plants. An example of such an interest is the device described in the U.S. Pat. No. 4,778,579 which is representative of the state of the art. This device, as many others described in other patents, foresees the use of an adjuster of voltage which is directed to make compatible the two voltages at the two ends of the electrolyzer and of the fuel cells. These voltages vary as the current varies and, at a constant current, with the varying of time, as described in FIG. 2 of U.S. Pat. No. 4,778,579. The voltage adjusters suitable for electric power of electrochemical plants are expensive devices which have thus the same inconveniences of the aforementioned inverters, which make the installation of the system based on fuel cells hardly economically attractive.

SUMMARY OF THE INVENTION

It is the object of the present invention to provide a method for the direct integration of fuel cells in an electrochemical plant. By direct integration it is intended the connection of fuel cells to electrolyzers by means of bus bars without interposition of any voltage converter or adjuster or similar devices, used in the prior art.

BRIEF DESCRIPTION OF THE INVENTION

The invention will be now described making reference to the figures wherein.

DETAILED DESCRIPTION OF THE INVENTION

Figure 1:
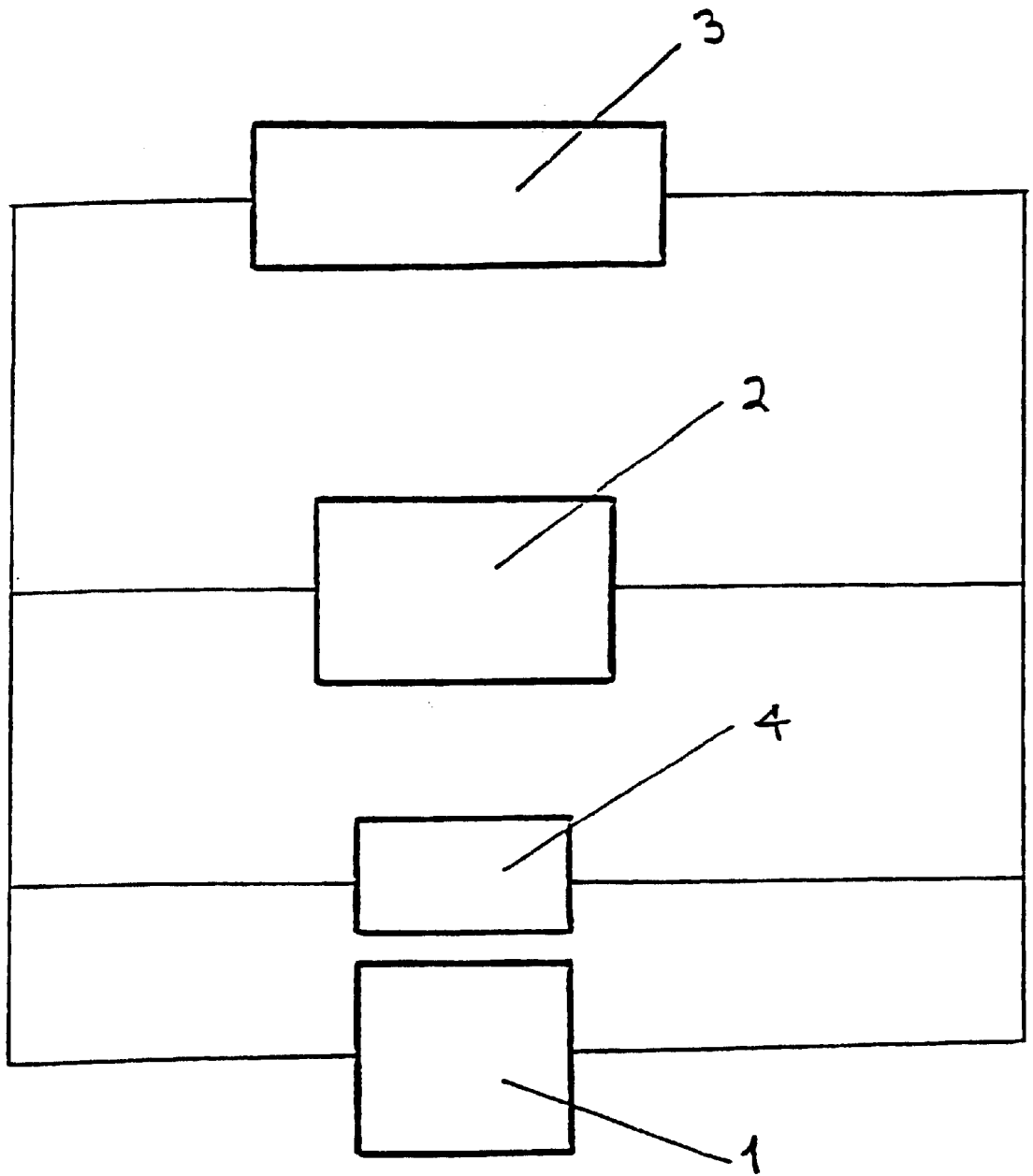
FIG. 1 is a schematic view of a connection of the fuel cell-electrolyzers-rectifier-voltage adjuster of the prior art.

In the figures the same parts are indicated by the same reference numerals, in particular the fuel cell is identified by reference numeral 1, the electrolyzer by 2, the rectifier by 3 and the voltage adjuster is indicated by reference numeral 4.

Figure 2:
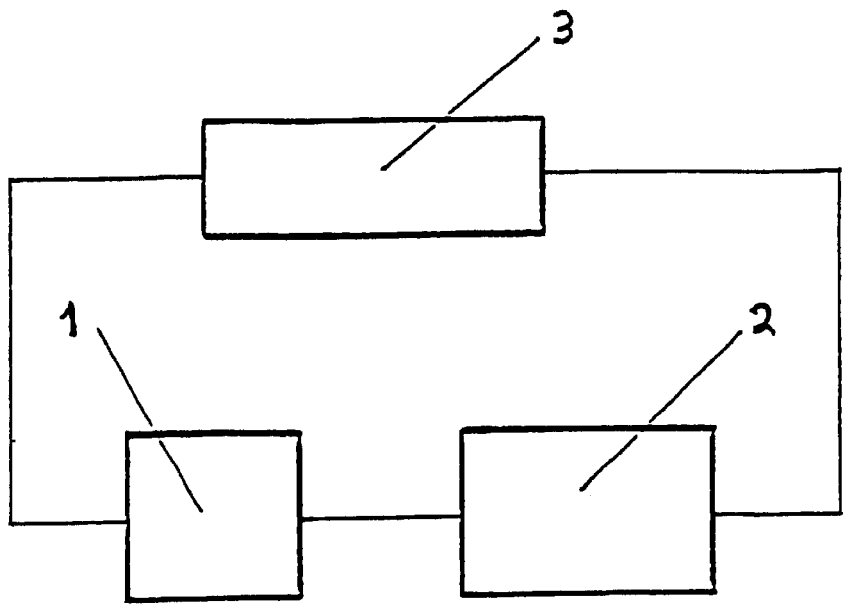
FIG. 2 is a schematic view of a connection of the fuel cell-electrolyzers-rectifier according to the present invention, made in series.
Figure 3:
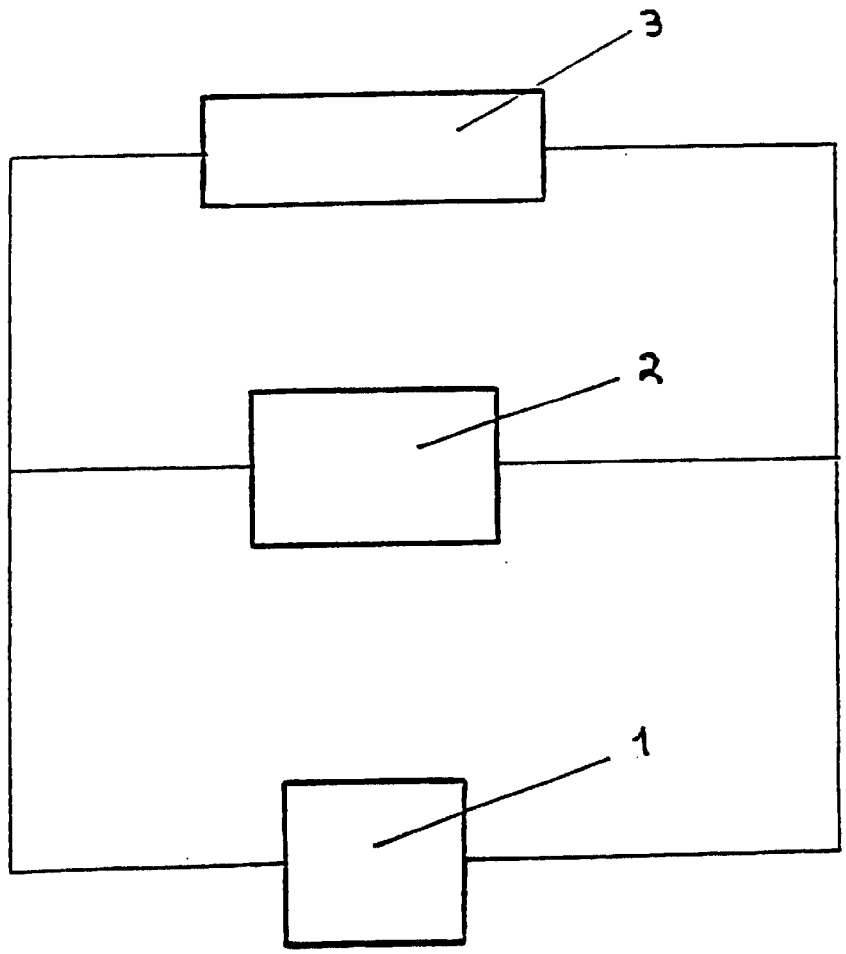
FIG. 3 is a schematic view of a connection of the fuel cell-electrolyzers-rectified according to the present invention, made in parallel.

FIG. 2 schematises the series connection of fuel cells-electrolyzers-rectifier. This connection is characterised by a uniform electric current in the various points of the circuit and by an electric voltage required by the rectifier given by the difference between the electrolyzer voltage and fuel cell voltage. Conversely, FIG. 3 schematises the parallel connection of the fuel cells to the electrolyzers-rectifier circuit. In this case the voltages of the three components are the same, while the current fed to the electrolyzers is given by the sum of the current output of the fuel cells and of the rectifier. Both systems offer advantages and present shortcomings which are in a certain way complementary, depending on the different applications. In particular:

the connection in series does not require any control of the current output of the fuel cells as in fact the current is the one imposed by the rectifier. There is no need to control the voltage of the fuel cells to make it compatible with that of the electrolyzers as the balance is provided by the rectifier. From what said above it is clear that the connection in series is particularly simple as concerns the control system and is highly ductile in adjusting to the variations of the electric load. However, it is suitable only for circuits with substantially low electric current and requires, at the same power output, a higher number of fuel cells with respect to the connection in parallel.

The connection in parallel is suitable for any range of electric current, even for the very high current typical of monopolar electrolyzers. Its control, although more complex than the system in series, is anyway still acceptable in the industrial scale. Further the connection in parallel permits to use a lower number of fuel cells with respect to the connection in series.

Figure 4:
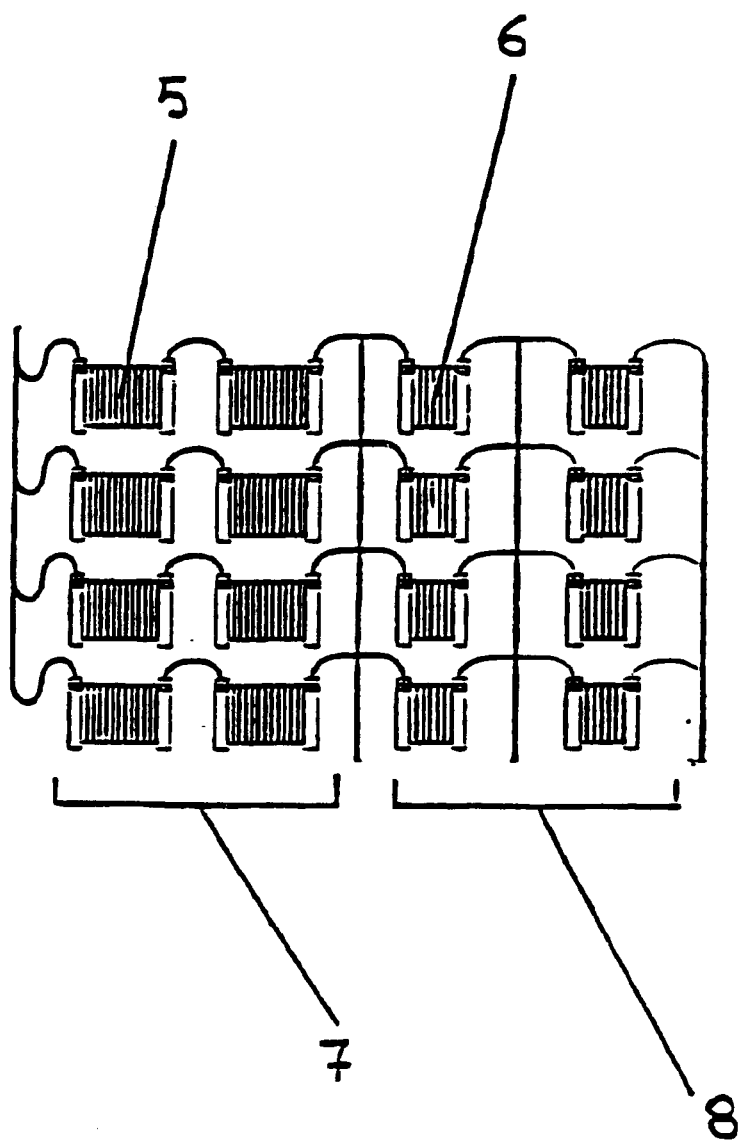
FIG. 4 is a schematic view of a fuel cell module.
Figure 5:
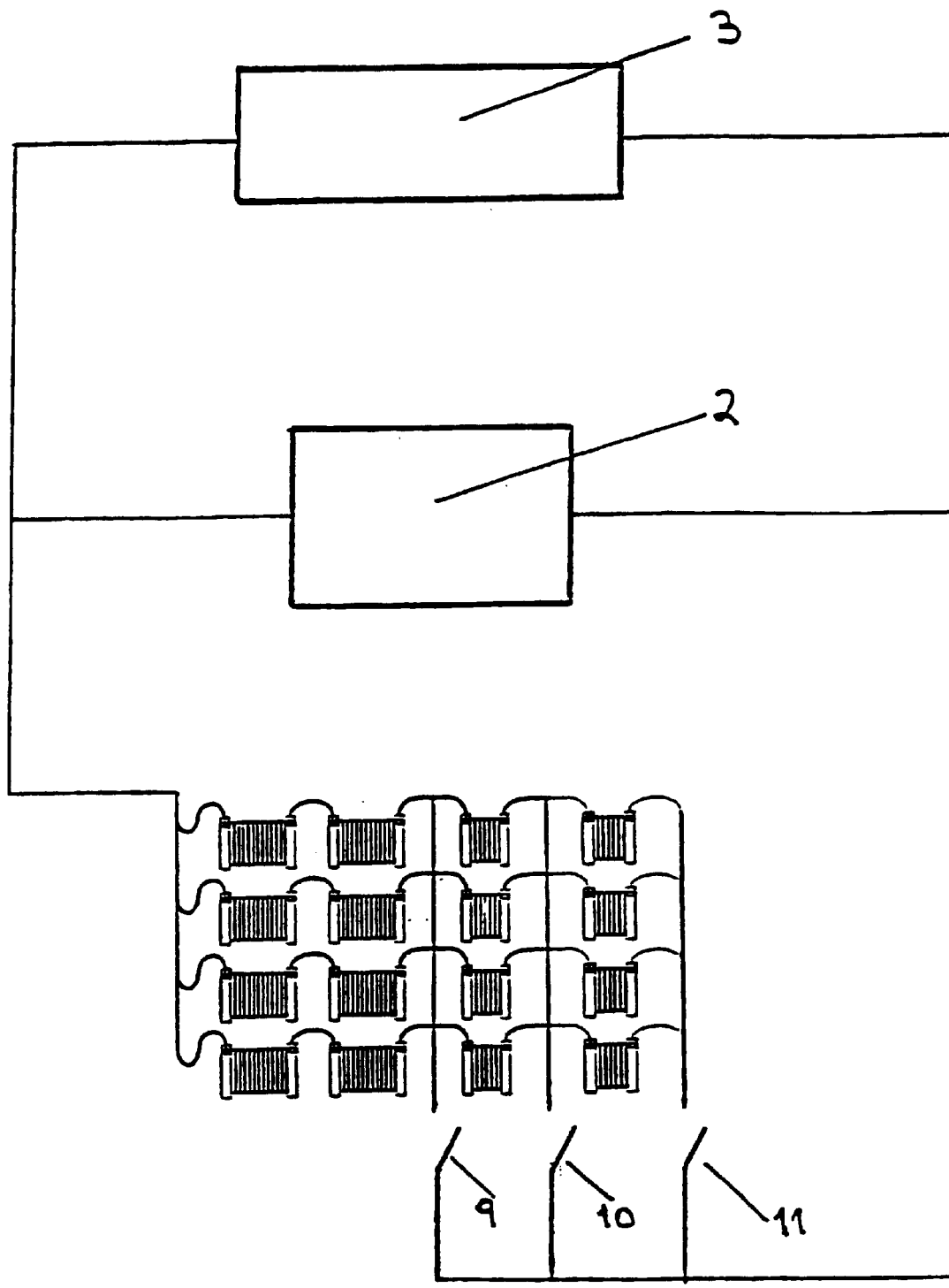
FIG. 5 is a schematic view of a connection in parallel of the fuel cell module of FIG. 4 with the electrolyzers-rectifier.
Figure 6:
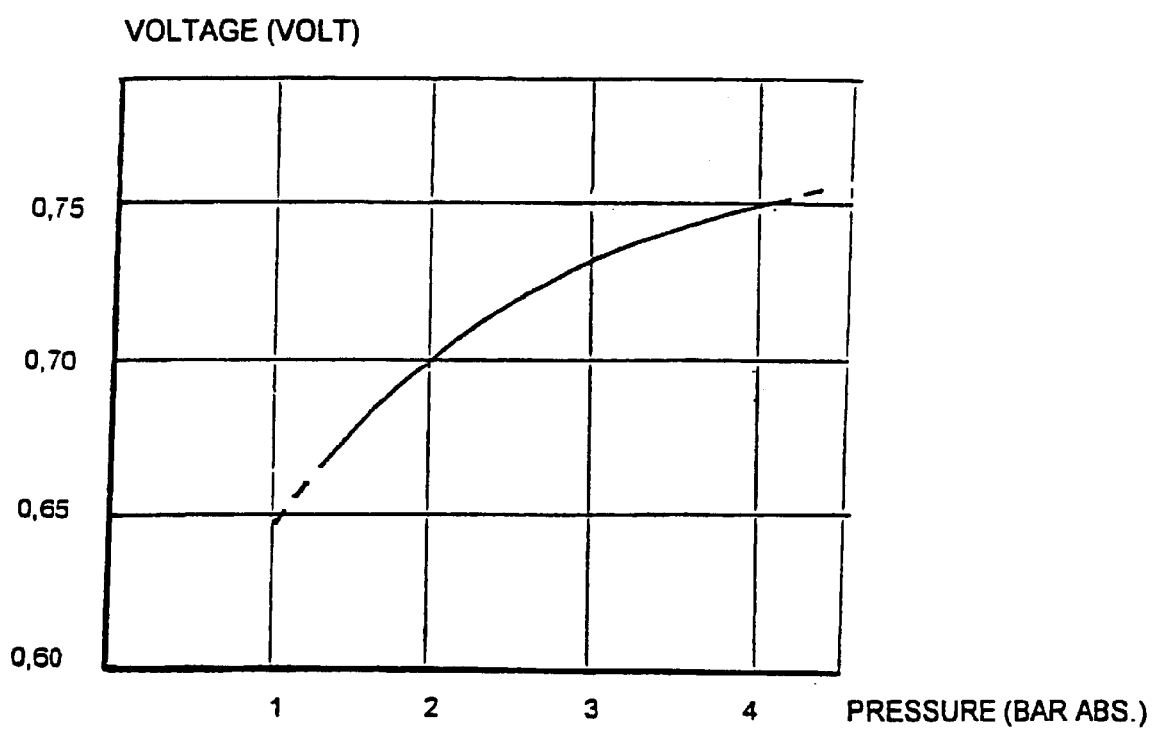
FIG. 6 is a diagram showing the behaviour of an elementary fuel cell as a function of the voltage.

The control of the overall output of the fuel cells may be achieved by using a suitable base module. The total fuel cell system is made of as many base modules as necessary to ensure complete utilisation of all the available hydrogen. FIG. 4 shows the structure of a possible base module. Reference number 5 and 6 indicate the so-called stacks of fuel cells (the stack is the assembly of elementary fuel cells supplied by the producers as the commercial product). The embodiment illustrated in FIG. 4 is purely an example and must not be considered in any way as a limitation of the objects of the present invention. This embodiment comprises two sections for the base module, indicated by reference numerals 7 and 8, each one made respectively of 2 stacks in series, respectively of the type 5 and 6. The stack of type 6 in FIG. 4 is made of a number of elementary fuel cell which is half the number of the fuel cells of the stack of type 5. Supposing to use just one module of FIG. 4, FIG. 5 shows the connection in parallel with the electolyzers and the rectifier. In particular in FIG. 5 it can be seen how the connection of the module may be carried out through the interrupters indicated by reference numerals 9, 10 and 11. When the interrupter 11 is activated, the voltage output of the module is maximum, and it is reduced to 80% and 70% respectively when interrupters 10 or 9 are activated. With this structure of the module allowed by the typical dimensions of a stack of membrane fuel cells, the voltage of the fuel cell system can be adjusted with time in order to make it compatible with that of the electrolyzers. The voltage of the latter may vary with time as a consequence of the continuous efficiency loss of the various components, such as the electrode, the catalytic activity of which undergoes a slow but constant decay. It is evident that the adjustment of the fuel cell stack voltage is of the intermittent type and is the more accurate the higher is the number of interrupters applied to the module. The need to use quantities of hydrogen which vary depending on the current fed to the electrolyzers is satisfied by sequentially connecting to the electrolyzers-rectifiers a certain number of modules in parallel. As the voltage of the electrolyzers depends, besides the time of operation as above discussed, also on the intensity of the current fed thereto, the activation of the interrupters which vary the number of inserted modules and the electric voltage of the modules themselves is effected by an iterative procedure which is performed by a computerised control and supervision system. An alternative embodiment of the present invention foresees that the variation of voltage of the modules be obtained by varying the pressure of the air fed to the fuel cells. FIG. 6 represents the behaviour as a function of the voltage of an elementary fuel cell, which, as aforementioned, is the base element of the stack. It must be noted that it is the air pressure, and not the hydrogen pressure, that influences in a remarkable way the voltage. Therefore, when the air pressure is varied, not necessarily also the hydrogen pressure must be varied. This situation is typically permitted by the membrane fuel cells which, if properly designed, are capable of undergoing air-hydrogen pressure differentials up to some bars.

It must be understood that the above embodiment are not intended as a limitation of the invention. The present invention as above described intends to cover any modifications, substitutions, omissions, or alternative configurations which fall within the spirit and scope of the invention, as defined by the following appended claims.

What is claimed is:

1. Method for electrically connecting fuel cells to electrochemical plants comprising electrolyzers equipped with electrically conductive bus bars and rectifiers, said electrolyzers forming hydrogen as a by-product, the fuel cells being fed with said hydrogen and air under pressure, characterized in that said method is a direct connection of the fuel cell to the electrically conductive bus bars of the electrolyzers without any intermediate stage of voltage conversion or adjustment.

2. The method of claim 1 characterized in that said connection is in series.

3. The method of claim 1 characterized in that said connection is in parallel.

4. The method of claim 3 characterised in that it comprises sequentially inserting said modules to permit the use of said hydrogen in said fuel cells.

5. The method of claim 4 characterised in that it comprises sequentially inserting said modules and said module sections by a computerised control and supervision system.

6. The method of claim 4 characterised in that it comprises sequentially inserting said modules and varying the air pressure by means of a computerised control and supervision system.

7. The method of claim 3 characterised in that it comprises regulating the electric voltage of said fuel cells by sequentially inserting said module sections.

8. The method of claim 7 characterized in that it comprises sequentially inserting said modules and varying the air pressure by means of a computerized control and supervision system.

9. The method of claim 3 characterised in that it comprises regulating the electric voltage of said fuel cells by varying the air pressure.

10. The method of claim 1 characterized in that said fuel cells are assembled in modules made of sections.

11. The method of claim 10 characterized in that it comprises sequentially inserting said modules to permit the use of said hydrogen in said fuel cells.

12. The method of claim 10 characterized in that it comprises regulating the electric voltage of said fuel cells by sequentially inserting said module sections.

13. The method of claim 10 characterized in that it comprises regulating the electric voltage of said fuel cells by varying the air pressure.

14. The method claim 10 characterized in that it comprises sequentially inserting said modules and said module sections by a computerized control and supervision system.

15. An electrochemical plant comprising electrolyzers equipped with electrically conductive bus bars and rectifiers said electrolyzers producing hydrogen as a by-product of electrolysis means for feeding said hydrogen and pressurized air to a plurality of fuel cells and a connection for transferring electricity produced in the plurality of fuel cells to the said bus bars of the electrolyzers without voltage conversion or adjustment.

16. The electrochemical plant of claim 15 wherein the connection for transferring electricity to the bus bars is parallel.

17. The electrochemical plant of claim 15 wherein the connection for transferring electricity to the bus bars is series.

18. The electrochemical plant of claim 15 wherein the plurality of fuel cells are assembled in module sections provided with pressure varying apparatus.

19. The electrochemical plant of claim 18 wherein the pressure varying apparatus comprises a control unit for selectively activating said module sections.

20. The electrochemical plant of claim 18 wherein said voltage varying apparatus comprises an air pressure varying device to vary the air pressure fed to said module sections.

* * * * *